US011332249B2

(12) United States Patent
Johnson et al.

(10) Patent No.: US 11,332,249 B2
(45) Date of Patent: May 17, 2022

(54) ACTUATABLE DISPLAY DEVICES FOR AIRCRAFT PASSENGER COMPARTMENT SUITES

(71) Applicant: B/E Aerospace, Inc., Winston-Salem, NC (US)

(72) Inventors: Glenn A. Johnson, Rural Hall, NC (US); Robert D. Wilkey, Atlanta, GA (US); Mark B. Dowty, Rural Hall, NC (US); Lyle T. Davis, Pfafftown, NC (US); Dennis M. Heuer, Kernersville, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 240 days.

(21) Appl. No.: 16/742,720

(22) Filed: Jan. 14, 2020

(65) Prior Publication Data

US 2021/0214084 A1   Jul. 15, 2021

(51) Int. Cl.
*B64D 11/00*    (2006.01)
*B64D 11/06*    (2006.01)

(52) U.S. Cl.
CPC ...... *B64D 11/0015* (2013.01); *B64D 11/0606* (2014.12)

(58) Field of Classification Search
CPC .......... B64D 11/0015; B64D 11/00153; B64D 11/0602; B64D 11/0606
See application file for complete search history.

(56) References Cited

U.S. PATENT DOCUMENTS

| 7,057,811 B2 | 6/2006 | Bruegl et al. |
| 7,082,028 B2 | 7/2006 | Huilgol et al. |
| 8,259,437 B2 | 9/2012 | Vesely |

(Continued)

FOREIGN PATENT DOCUMENTS

| CN | 2722294 Y | 8/2005 |
| CN | 108153101 A | 6/2018 |

(Continued)

OTHER PUBLICATIONS

Extended Search Report for European Application No. 21150916.1 dated Jun. 9, 2021, 9 pages.

*Primary Examiner* — Timothy D Collins
*Assistant Examiner* — Justin Michael Heston
(74) *Attorney, Agent, or Firm* — Suiter Swantz pc llo

(57) ABSTRACT

An aircraft passenger compartment suite may include a privacy divider configured to separate a first side of the aircraft passenger compartment suite including a first aircraft seat and a second side of the aircraft passenger compartment suite including a second aircraft seat. The aircraft passenger compartment suite may include a collapsible display device positioned proximate to the privacy divider of the aircraft passenger compartment suite. The aircraft passenger compartment suite may include a first display device and a first plate configured to be an extension of a horizontal surface in the first side when the first display device is in a first display device stowed position. The aircraft passenger compartment suite may include a second display device and a second plate configured to be an extension of a horizontal surface in the second side when the second display device is in a second display device stowed position.

8 Claims, 14 Drawing Sheets

(56) References Cited

U.S. PATENT DOCUMENTS

| | | |
|---|---|---|
| 8,267,472 B2 | 9/2012 | Large et al. |
| 8,315,047 B2 | 11/2012 | Tsuchihashi et al. |
| 8,462,103 B1 | 6/2013 | Moscovitch et al. |
| 9,010,852 B1 | 4/2015 | Conrad et al. |
| 10,246,192 B1 | 4/2019 | Prasad |
| 10,343,778 B2 | 7/2019 | Peuziat |
| 2007/0034742 A1* | 2/2007 | Jaeger .................. B64D 11/00 244/118.6 |
| 2010/0171350 A1 | 7/2010 | Large et al. |
| 2013/0070171 A1 | 3/2013 | Boyer, Jr. |
| 2013/0242523 A1 | 9/2013 | Wallace et al. |
| 2016/0159481 A1 | 6/2016 | Gianakopoulos et al. |
| 2016/0297524 A1* | 10/2016 | Simeon ............. B64D 11/0601 |

FOREIGN PATENT DOCUMENTS

| | | |
|---|---|---|
| DE | 102005006341 A1 | 8/2006 |
| DE | 102008012523 A1 | 9/2009 |
| FR | 2875455 B1 | 12/2006 |
| GB | 2481047 A | 12/2011 |
| JP | 2011249218 A | 12/2011 |
| WO | 2016018731 A1 | 2/2016 |
| WO | 2018178276 A1 | 10/2018 |

\* cited by examiner

ACTUATABLE DISPLAY DEVICES FOR AIRCRAFT PASSENGER COMPARTMENT SUITES

BACKGROUND

An aircraft passenger compartment suite may include one or more seats. In select arrangements where there are multiple seats, the multiple seats may face the same side of a privacy divider, and the passengers occupying the set of seats may wish to simultaneously view the same display device. In addition, in select arrangements where there are multiple seats, the multiple seats may be separated by, and may face different sides of, a privacy divider. The privacy divider may be opened a select amount to allow for interaction between passengers.

SUMMARY

An aircraft passenger compartment suite is disclosed, in accordance with one or more embodiments of the disclosure. The aircraft passenger compartment suite may include a privacy divider configured to separate a first side of the aircraft passenger compartment suite including a first aircraft seat and a second side of the aircraft passenger compartment suite including a second aircraft seat. The aircraft passenger compartment suite may include a collapsible display device positioned proximate to the privacy divider of the aircraft passenger compartment suite. The collapsible display device may be configured to actuate between a deployed position and a stowed position. The collapsible display device may be configured to display an image output when in the deployed position.

In some embodiments, the collapsible display device may be a standalone display device configured to receive a signal, generate the image output based on the signal, and display the image output.

In some embodiments, the aircraft passenger compartment suite may include a projection device coupled to a privacy shell element of the aircraft passenger compartment suite. The projection device may be configured to receive a signal, generate the image output based on the signal, and project the image output. The collapsible display device may include a projector screen configured to display the image output projected by the projection device.

In some embodiments, the first side may include a first display device configured to actuate between a first display device deployed position and a first display device stowed position. The first display device may be configured to display an image output when in the first display device deployed position. The first side may include a first plate positioned proximate to a rear surface of the first display device. The first plate may be configured to be an extension of a horizontal surface in the first side of the aircraft passenger compartment suite when the first display device is in the first display device stowed position.

In some embodiments, the collapsible display device may be positioned within the first side of the aircraft passenger compartment suite. The collapsible display device may be configured to deploy after the first display device is actuated into the first display device stowed position.

In some embodiments, the second side may include a second display device. The second display device may be configured to actuate between a second display device deployed position and a second display device stowed position. The second display device may be configured to display an image output when in the second display device deployed position. The second side may include a second plate positioned proximate to a rear surface of the second display device. The second plate may be configured to be an extension of a second horizontal surface in the second side of the aircraft passenger compartment suite when the second display device is in the second display device stowed position.

In some embodiments, the collapsible display device may be positioned within the second side of the aircraft passenger compartment suite. The collapsible display device may be configured to deploy after the second display device is actuated into the second display device stowed position.

An aircraft passenger compartment suite is disclosed, in accordance with one or more embodiments of the disclosure. The aircraft passenger compartment suite may include a first side. The first side may include a first display device positioned proximate to a first aircraft seat. The first display device may be configured to actuate between a first display device deployed position and a first display device stowed position. The first display device may be configured to display an image output when in the first display device deployed position. The first side may include a first plate positioned proximate to a rear surface of the first display device. The first plate may be configured to be an extension of a first horizontal surface in the first side of the aircraft passenger compartment suite when the first display device is in the first display device stowed position. The aircraft passenger compartment suite may include a second side. The second side may include a second display device proximate to a second aircraft seat. The second display device may be configured to actuate between a second display device deployed position and a second display device stowed position. The second display device may be configured to display an image output when in the second display device deployed position. The second side may include a second plate positioned proximate to a rear surface of the second display device. The second plate may be configured to be an extension of a second horizontal surface in the second side of the aircraft passenger compartment suite when the second display device is in the second display device stowed position.

In some embodiments, the first plate may include a guard configured to protect at least a portion of the first display device when the first display device is in the first display device stowed position.

In some embodiments, the first horizontal surface may be a surface of a monument in the first side of the aircraft passenger compartment suite.

In some embodiments, the second plate may include a guard configured to protect at least a portion of the second display device when the second display device is in the second display device stowed position.

In some embodiments, the second horizontal surface may be a surface of a monument in the second side of the aircraft passenger compartment suite.

In some embodiments, the deployed position for the first display device may be an outward-facing position toward the first aircraft seat. The stowed position for the first display device may be a downward-facing position.

In some embodiments, the deployed position for the second display device may be an outward-facing position toward the second aircraft seat. The stowed position for the second display device may be a downward-facing position.

In some embodiments, the aircraft passenger compartment suite may include a privacy divider configured to separate the first side of the aircraft passenger compartment suite including the first aircraft seat and the second side of the aircraft passenger compartment suite including the second aircraft seat. The aircraft passenger compartment suite may include a collapsible display device positioned proximate to the privacy divider of the aircraft passenger compartment suite. The collapsible display device may be positioned proximate to at least one of the first aircraft seat or the second aircraft seat. The collapsible display device may be configured to actuate between a deployed position and a stowed position. The collapsible display device may be configured to display an image output when in the deployed position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
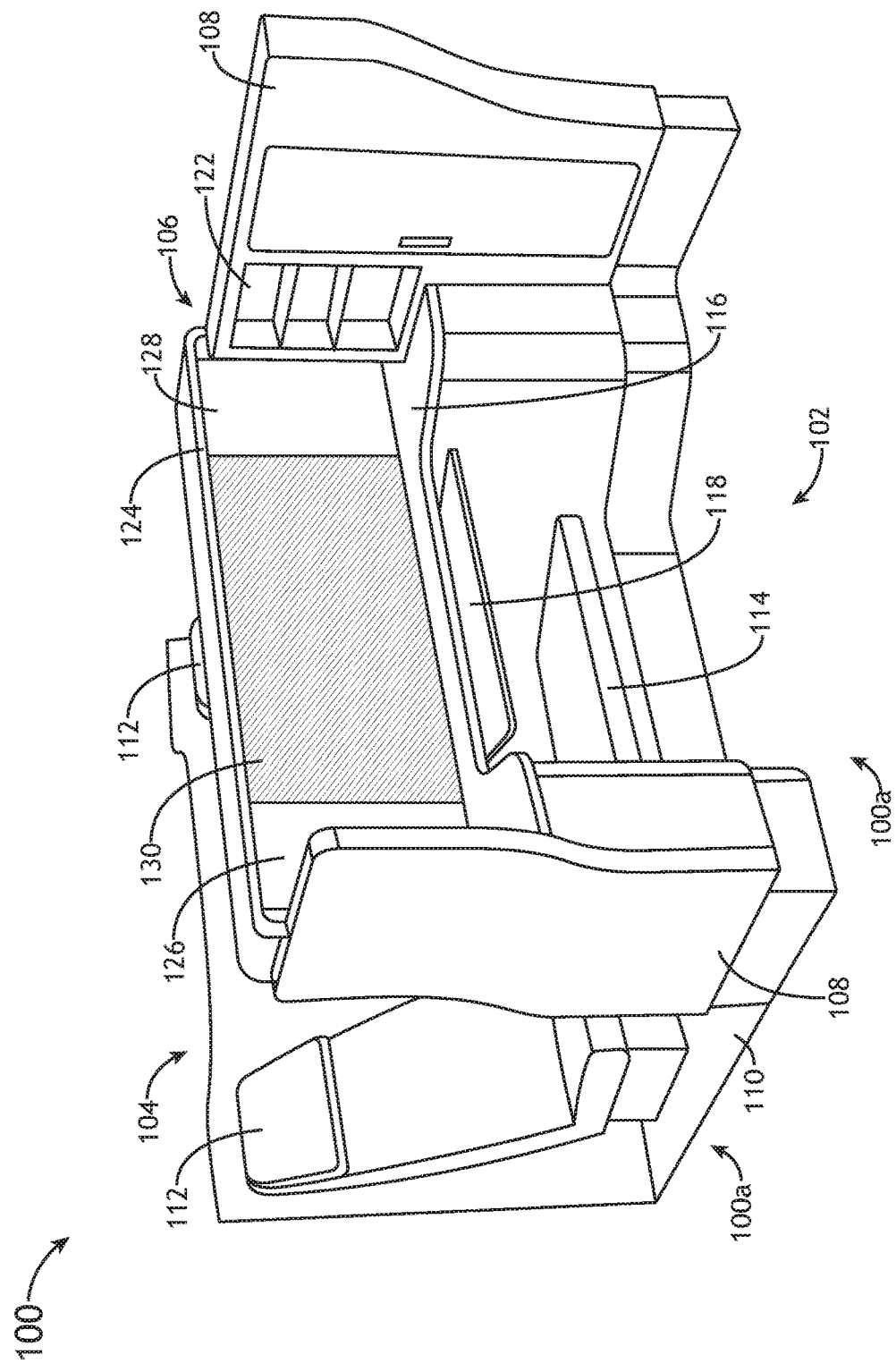
FIG. 1A illustrates an aircraft passenger compartment suite, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-5 generally illustrate actuatable display devices for aircraft passenger compartment suites, in accordance with one or more embodiments of the disclosure.

An aircraft passenger compartment suite may include one or more seats. In select arrangements where there are multiple seats, the multiple seats may face the same side of a privacy divider, and the passengers occupying the set of seats may wish to simultaneously view the same display device. In addition, in select arrangements where there are multiple seats, the multiple seats may be separated by, and may face different sides of, a privacy divider. The privacy divider may be opened a select amount to allow for interaction between passengers.

Opening the privacy divider may require re-positioning one or more divider panels of the privacy divider and/or re-positioning one or more display devices in the aircraft passenger compartment suite. Select known mechanisms for relocating the display devices include lateral slide mechanisms. The lateral slide mechanisms, however, may be heavy, especially ones necessary to counteract the weight of larger display devices. In addition, the mechanisms may result in a limited ability to open up the privacy divider (e.g., due to the horizontal dimensions of the display devices).

As such, it would be beneficial to provide actuatable display devices configured to be viewable by multiple passengers on the same side of a privacy divider. In addition, it would be beneficial to provide actuatable display devices configured to actuate with stowage mechanisms having a lower weight than the select known mechanisms used to move current display devices. Further, it would be beneficial to provide actuatable display devices configured to actuate with stowage mechanisms that reduce and/or eliminate lateral motion of the display devices (e.g., to increase an opening in the privacy divider through which passengers may interact).

FIGS. 1A-4E illustrate an aircraft passenger compartment suite 100, in accordance with one or more embodiments of the disclosure.

The aircraft passenger compartment suite 100 may include one or more sides. For example, the aircraft passenger compartment suite 100 may include a side 102 and a side 104 separated by a privacy divider 106. The aircraft passenger compartment suite 100 may include one or more passenger compartments 100*a*. For example, the aircraft passenger compartment suite 100 may include one or more passenger compartments 100*a* within the side 102 and/or one or more passenger compartments 100*a* within the side 104.

The aircraft passenger compartment suite 100 may include a privacy shell with one or more privacy shell elements 108. The privacy shell may include an opening 110 within the one or more privacy shell elements 108 into the aircraft passenger compartment 100*a*. The aircraft passenger compartment suite 100 may include a door for the opening 110. For example, the door may swing or slide into an open position against a privacy shell element 108. By way of another example, a privacy shell element 108 may be at least partially hollow, and the door may be slid into a cavity defined in the one or more privacy shell elements 108.

The aircraft passenger compartment 100*a* may include one or more aircraft seats 112. For example, the aircraft passenger compartment 100*a* may include one aircraft seat 112. By way of another example, the aircraft passenger compartment 100*a* may include two aircraft seats 112. A privacy shell element 108 may be configured to receive at least a portion of the aircraft seat 112. For example, the privacy shell element 108 may be configured to receive a seat back of the aircraft seat 112.

To allow for a more compact configuration of the aircraft seats 112 in the aircraft passenger compartment suite 100, the one or more aircraft seats 112 in the side 102 may be offset from (e.g., not directly across from) the one or more aircraft seats 112 in the side 104. It is noted herein, however, the one or more aircraft seats 112 in the side 102 may be directly across from the one or more aircraft seats 112 in the side 104, where configuration of the aircraft passenger compartment suite 100 allows.

The aircraft passenger compartment 100*a* may include one or more ottomans 114. For example, the side 102 and the side 104 may include an ottoman 114 positioned a select distance from each aircraft seat 112. By way of another example, the ottoman 114 may be positioned within a footwell. For instance, one or more dimensions of the footwell may be changed by transitioning the aircraft seat 112 between an upright position, a reclined position, and/or a lie-flat position. It is noted herein that a portion of the ottoman 114 may be actuatable (e.g., along a set of tracks or linear rails) to a position outside of the footwell.

To allow for a more compact configuration of the one or more ottomans 114 in the aircraft passenger compartment suite 100, the one or more ottomans 114 in the side 102 may be offset from (e.g., not directly across from) the one or more ottomans 114 in the side 104. It is noted herein, however, the one or more ottomans 114 in the side 102 may be directly across from the one or more ottomans 114 in the side 104, where configuration of the aircraft passenger compartment suite 100 allows.

The one or more ottomans 114 may be configured to translate and/or rotate about an axis through a sidewall of the ottoman to point a top surface to a passenger occupying the aircraft seat 112. For example, where an ottoman 114 may be configured to both translate and rotate, the ottoman 114 may be configured to independently rotate and/or translate. By way of another example, where an ottoman 114 may be configured to both translate and rotate, a rotation may prevent further translation until the ottoman 114 is returned to a select position and/or a translation may prevent further rotation until the ottoman 114 is returned to a select position.

An aircraft seat 112 and an ottoman 114 may form a bed when the aircraft seat 112 and the ottoman 114 are each in a lie-flat or bed position. It is noted herein, however, the aircraft seat 112 and/or the ottoman 114 may be limited to an upright position and/or one or more reclined positions. In addition, it is noted herein the aircraft seat 112 may be the sole component forming a bed when the aircraft seat 112 is in a lie-flat or bed position.

The aircraft seat 112 may be translatable (e.g., trackable or slidable). The aircraft seat 112 may be rotatable about an axis cross-wise through the aircraft seat 112 into a position including, but not limited to, an upright or raised position, one or more reclined positions, and/or a bed or lie-flat position. The aircraft seat 112 may be rotatable about an axis (e.g., swivelable). The aircraft seat 112 may be fully positionable between the outer limits of motion as defined by the moveable components of the aircraft seat 112, and/or other monuments of the aircraft passenger compartment 100*a*. It is noted herein a fully upright or raised position may be considered a taxi, takeoff, or landing (TTOL) position during select stages of flight (though the upright position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 112 may be actuatable (e.g., translatable and/or rotatable) from the TTOL position to a non-TTOL position, and/or vice versa.

The aircraft passenger compartment 100a may include one or more monuments 116. For example, a monument 116 may include, but is not limited to, a side stand, a tray or table, or the like. A monument 116 may include an accessible surface for a passenger occupying the aircraft passenger compartment 100a.

The aircraft passenger compartment 100a may include a tray 118 for each aircraft seat 112. The tray 118 may include a top surface, a bottom surface, and one or more side surfaces. For example, the tray 118 may include a single continuous side surface where all corners are rounded. By way of another example, the tray 118 may include up to an N number of side surfaces where the tray 118 includes up to an N number of corners.

The tray 118 may be coupled to and/or positioned proximate to the privacy divider 106. The tray 118 may be coupled to a monument 116. The tray 118 may be configured to extend a select distance from a stowed position (e.g., under the privacy divider 106) to an extended position proximate to a passenger in an aircraft seat 112.

The aircraft passenger compartment 100a may include one or more lights 120. For example, the one or more lights 120 may be coupled to and/or partially inset in the one or more privacy shell elements 108.

The aircraft passenger compartment 100a may include one or more stowage compartments 122. For example, a stowage compartment 122 may be configured to receive and hold (e.g., contain, secure, or the like) one or more passenger amenities including, but not limited to, one or more pieces of carry-on luggage, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), headphones, wearable devices or clothing articles, food products, drink products, or the like. By way of another example, a stowage compartment 122 may include one or more electronic connections for one or more passenger amenities such as, but not limited to, one or more charging ports, one or more charging cables, or the like. By way of another example, a stowage compartment 122 may include one or more electronic connections in communication with one or more components of the aircraft passenger compartment suite 100 such as, but not limited to, one or more display device connection ports, one or more display device connection cables, one or more audio output jacks (e.g., headphone jacks), one or more audio input jacks, or the like. By way of another example, a stowage compartment 122 may include one or more safety devices (e.g., air masks, personal floatation devices, or the like). The one or more stowage compartments 122 may be coupled to and/or at least be partially inset in the one or more privacy shell elements 108, the one or more monuments 116, or the like.

The aircraft passenger compartment 100a may include one or more passenger in-flight entertainment devices (IFEs). The one or more IFEs may be housed and/or supported by a bridge 124. The bridge 124 may include one or more actuatable panels 126, 128.

The one or more actuatable panels 126, 128 may be configured to be flush with a bezel of the one or more IFEs so as to prevent the bezel of the one or more IFEs from being grabbed onto by a passenger in the aircraft passenger compartment suite 100 (e.g., when moving, in the case of an emergency, turbulence, or the like). It is noted herein the one or more IFEs and any actuation assemblies coupling the one or more IFEs to the privacy divider 106 may need to meet aviation guidelines and/or regulations, should the passenger in the aircraft passenger compartment suite 100 be able to grab onto the bezel of the one or more IFEs.

The one or more actuatable panels 126, 128 may be actuated from a deployed position to a stowed position. For example, the one or more actuatable panels 126, 128 may be stowed (e.g., via a lateral slide mechanism or a rotation mechanism) when the one or more IFEs are in the stowed position and the passengers of the aircraft passenger compartment suite 100 wish to open the privacy divider 106 between the side 102 and the side 104. By way of another example, the one or more actuatable panels 126, 128 may be actuated upward (e.g., flipped upward about an axis through a top edge of the one or more actuatable panels 126, 128, raised or lifted upward via a slide mechanism, rolled up, or the like) when the one or more IFEs are in the stowed position and the passengers of the aircraft passenger compartment suite 100 wish to open the privacy divider 106 between the side 102 and the side 104.

Although embodiments of the disclosure illustrate the use of one or more actuatable and non-collapsible panels 126, 128, it is noted herein the one or more actuatable panels 126, 128 may be collapsible. For example, the actuatable and collapsible panels 126, 128 may include, but are not limited to, a roll-up screen or shade, a side-collapsible screen or shade, a set of curtains, or other collapsible material that is moveable when it is desired that privacy between the side 102 and the side 104 be created or removed. The actuatable and collapsible panels 126, 128 may be drawn to the side proximate to a privacy shell element 108. The actuatable and collapsible panels 126, 128 may be raised into the bridge 124. The actuatable and collapsible panels 126, 128 may be lowered into a monument 116 of the privacy divider 106. The actuatable and collapsible panels 126, 128 may be held in place with a rope, a hook, or other device configured to secure the actuatable and collapsible panels 126, 128 in the stowed position. In this regard, the total weight of components such as the privacy divider 106 may be reduced.

The privacy divider 106 may be considered closed when at least one of the one or more IFEs of the side 102, the one or more IFEs of the side 104, and/or the one or more actuatable panels 126, 128 are in the deployed position. For example, the privacy divider 106 may be considered closed when the one or more IFEs of the side 102, the one or more IFEs of the side 104, and the one or more actuatable panels 126, 128 are in the respective deployed positions. By way of another example, the privacy divider 106 may be considered closed when the one or more IFEs of the side 102 and the one or more IFEs of the side 104 are in the respective deployed positions.

The privacy divider 106 may be considered open when at least one of the one or more IFEs of the side 102, the one or more IFEs of the side 104, and/or the one or more actuatable panels 126, 128 are in the stowed position. For example, the privacy divider 106 may be considered open when the one or more IFEs of the side 102, the one or more IFEs of the side 104, and the one or more actuatable panels 126, 128 are in the respective stowed positions. By way of another example, the privacy divider 106 may be considered open when the one or more IFEs in the passenger compartments 100a of the side 102 and the one or more IFEs in the passenger compartments 100a of the side 104 are in the respective stowed positions.

The actuation of the one or more panels 126, 128 and/or the actuation of the one or more IFEs may be assisted by one or more actuation devices. For example, the one or more actuation devices may include, but are not limited to, one or more springs (e.g., gas springs, mechanical springs, or the like), one or more actuators (e.g., solenoids, servo motors, or the like), and/or one or more mechanical assemblies driven by an actuator (e.g., one or more gear assemblies such as a worm gear-and-wheel assembly or a rack-and-pinion assembly, one or more chain-and-sprocket assemblies, one or more belt-and-pulley assemblies, or the like).

The one or more IFEs and/or the one or more actuatable panels 126, 128 may be unlocked from the stowed position via a manual latching or locking assembly (e.g., a push-to-release latch, or the like). For example, the manual latching or locking assembly may be situated directly on an actuation assembly of the one or more IFEs and/or situated directly on the one or more actuatable panels 126, 128. By way of another example, the manual latching locking assembly may have one or more components situated elsewhere in or proximate to the aircraft passenger compartment suite 100 (e.g., on the aircraft seat 112, on a monument 116, on an exterior surface of a privacy shell element 108, or the like). In the instance where the components are situated on an exterior surface of a privacy shell element 108 or elsewhere outside the aircraft passenger compartment suite 100, a passenger of the aircraft passenger compartment suite 100 may need to request the actuation be performed by a crew member. The one or more IFEs and/or the one or more actuatable panels 126, 128 may be unlocked from the stowed position via an electronic latching or locking assembly.

Although embodiments of the disclosure illustrate the one or more actuatable panels 126, 128 and the one or more IFEs as separate components, it is noted herein the one or more actuatable panels 126, 128 may be coupled to a rear surface of the one or more IFEs, either directly (e.g., coupled together) or indirectly (e.g., tied together via a cam follower assembly including a cam follower in a cam-shaped track) for a smooth transition. In addition, it is noted herein the one or more actuatable panels 126, 128 may be integrated with (e.g., form) the rear surface of the one or more IFEs. In this regard, the one or more actuatable panels 126, 128 may rotate with the one or more IFEs. In addition, although embodiments of the disclosure illustrate the one or more actuatable panels 126, 128 as separate components, it is noted herein the one or more actuatable panels 126, 128 may be tied together (e.g., via a cam follower assembly including a cam follower in a cam-shaped track) for a smooth transition. Therefore, the above description should not be interpreted as a limitation on the scope of the disclosure but merely an illustration.

Figure 1B:
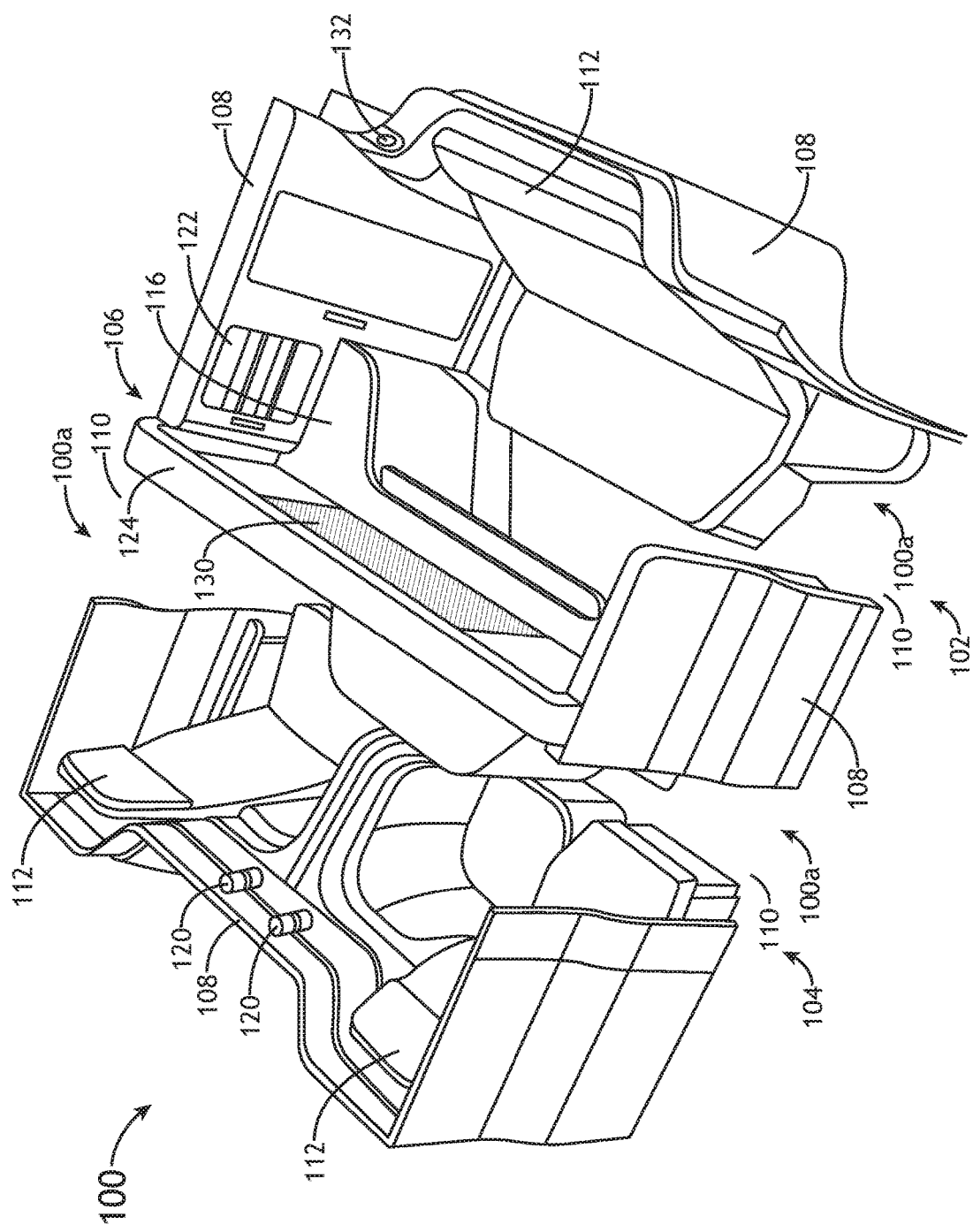
FIG. 1B illustrates an aircraft passenger compartment suite, in accordance with one or more embodiments of the disclosure.

Referring now to FIGS. 1A and 1B, the one or more IFEs may include, but are not limited to, one or more display devices 130 coupled to and/or positioned proximate to the privacy divider 106. The one or more display devices 130 may include a collapsible screen.

For example, the collapsible screen may be a standalone display device (e.g., a roll-up light-emitting-diode (LED) screen, or the like) configured to receive a signal, generate an image output based on the signal, and display the image output to a passenger in an aircraft seat 112.

By way of another example, the collapsible screen may be a screen (e.g., a projector screen, or the like) configured to display an image output projected on it by a projection device 132. The projection device 132 may be configured to receive a signal, generate an image output based on the signal, and project the image output onto the one or more display devices 130. The projection device 132 may be mounted (e.g., coupled to a privacy shell element 108) proximate to the one or more aircraft seats 112. The one or more display devices 130 (and the accompanying projection device 132) may be image-stabilized relative to the motion of a passenger aircraft including the aircraft passenger compartment suite 100.

The one or more display devices 130 may be actuatable from a deployed position to a stowed position. The one or more display devices 130 may be drawn to the side proximate to a privacy shell element 108. The one or more display devices 130 may be raised into or proximate to the bridge 124. The one or more display devices 130 may be lowered into or proximate to a monument 116 of the privacy divider 106.

The aircraft passenger compartment suite 100 may include one or more non-collapsible IFEs (e.g., as described throughout the disclosure) or one or more additional collapsible IFEs in addition to the one or more display devices 130. The use of non-collapsible IFEs in addition to the one or more display devices 130 may allow for the display of multiple screens. For example, a primary graphical user interface (GUI) window may display content when the one or more display devices 130 are in the deployed orientation, while a secondary GUI window may display additional content (e.g., a menu for the passenger aircraft, call options to the crew members of the passenger aircraft, flight path location, advertising, controls for the aircraft passenger compartment suite, or the like) on the one or more non-collapsible IFEs.

Where the aircraft passenger compartment suite 100 includes one or more non-collapsible IFEs in addition to the one or more display devices 130, the one or more display devices 130 may be deployed before or after any non-collapsible IFEs of the aircraft passenger compartment suite 100 are actuated from a deployed position to a stowed position.

It is noted herein, however, that the aircraft passenger compartment suite 100 may include the one or more display devices 130 without any non-collapsible IFEs. In this regard, existing aircraft passenger compartment suites may be retrofitted with the one or more display devices 130 and the projection device 132.

The one or more display devices 130 may be driven by an actuator (e.g., a motor, or the like) coupled to a controller of the aircraft passenger compartment suite 100 between the deployed position and the stowed position. It is noted herein, however, the one or more display devices 130 may be manually deployed and/or stowed.

The one or more display devices 130 may be docked when in the deployed position and/or the stowed position to prevent unintended actuation of the one or more display devices 130. For example, the privacy divider 106 may include one or more anchor points configured to secure to the one or more display devices 130. By way of another example, the one or more display devices 130 may include one or more anchor points configured to secure to the privacy divider 106.

Docking the one or more display devices 130 with the one or more anchor points when in the deployed position and/or the stowed position may reduce or eliminate the need for actuating harnesses and/or actuating mechanisms. For example, the one or more display devices 130 may be allowed to freely actuate between the deployed position and the stowed position without the assistance of actuating harnesses and/or actuating mechanisms, as the one or more anchor points may reduce or eliminate the need for the actuating harnesses and/or actuating mechanisms to lock the one or more display devices 130 in the deployed position and/or the stowed position.

It is noted herein that actuating the display device 130 from the deployed position to the stowed position may have a few benefits. For example, doing so may increase open area in the center privacy divider 106 between the side 102 and the side 104. For instance, the combined width of the one or more display devices 130 in the aircraft passenger compartment 100a may be substantially similar to the width of the privacy divider 106 when the one or more display devices 130 in the aircraft passenger compartment 100a are in the deployed position.

It is noted herein the one or more display devices 130 may operate as a collapsible barrier between the side 102 and the side 104 when the one or more display devices 130 are in the deployed position.

Although embodiments of the disclosure include the one or more display devices 130 and the projection device 132 in the side 102, it is noted herein the side 104 may also include the one or more display devices 130 and the projection device 132. For example, the one or more display devices 130 and the projection device 132 in the side 102 may provide media content independently from the one or more display devices 130 and the projection device 132 in the side 104. By way of another example, the one or more display devices 130 and the projection device 132 in the side 102, and the one or more display devices 130 and the projection device 132 in the side 104 may provide the same media content as selected by the passengers in the aircraft passenger compartment suite 100 or crew members.

Although embodiments of the disclosure illustrate the one or more display devices 130 as collapsible, it is noted herein the one or more display devices 130 may be non-collapsible (e.g., as described through the disclosure). Therefore, the above description should not be interpreted as a limitation on the scope of the disclosure but merely an illustration.

Referring now to FIGS. 2A-4E, the one or more IFEs may include, but are not limited to, one or more display devices 200 coupled to and/or positioned proximate to the privacy divider 106. For example, the one or more display devices 200 may include a non-collapsible screen (e.g., a monitor, a television, or the like) configured to receive a signal, generate an image output based on the signal, and display the image output to a passenger in an aircraft seat 112.

The one or more display devices 200 may be actuatable from a deployed position to a stowed position. The one or more display devices 200 may be coupled to an actuation assembly. It is noted herein that the terms actuation assembly, stowage mechanism, display device actuation assembly, and display device stowage mechanism may be considered equivalent, for purposes of the present disclosure.

To allow for a more compact configuration of the one or more display devices 200 in the aircraft passenger compartment suite 100, the one or more display devices 200 in the side 102 may be offset from (e.g., not directly across from) the one or more display devices 200 in the side 104. It is noted herein, however, the one or more display devices 200 in the side 102 may be directly across from the one or more display devices 200 in the side 104, where configuration of the aircraft passenger compartment suite 100 allows.

Figure 2A:
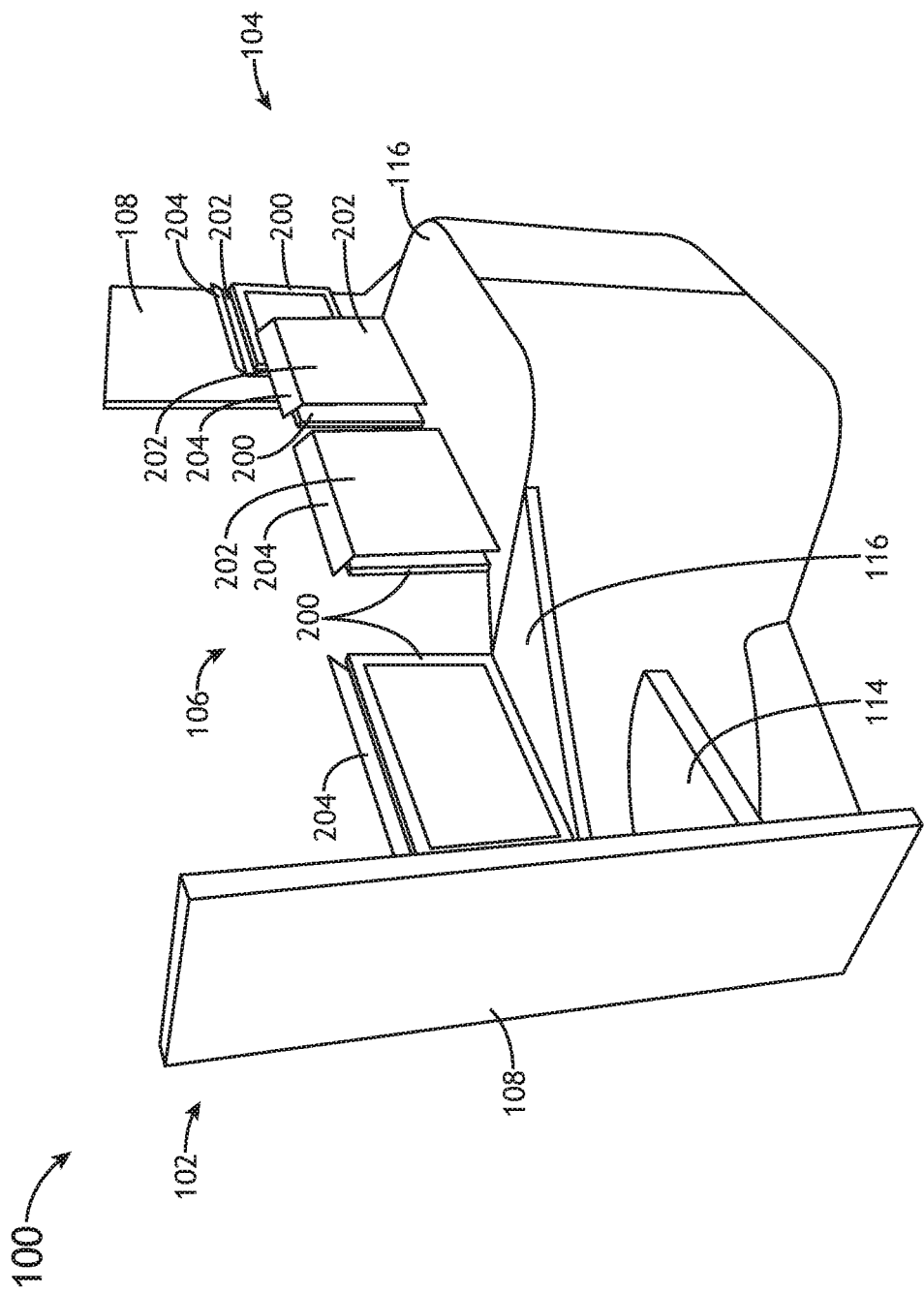
FIG. 2A illustrates actuatable display devices in an aircraft passenger compartment suite, in accordance with one or more embodiments of the disclosure.
Figure 2B:
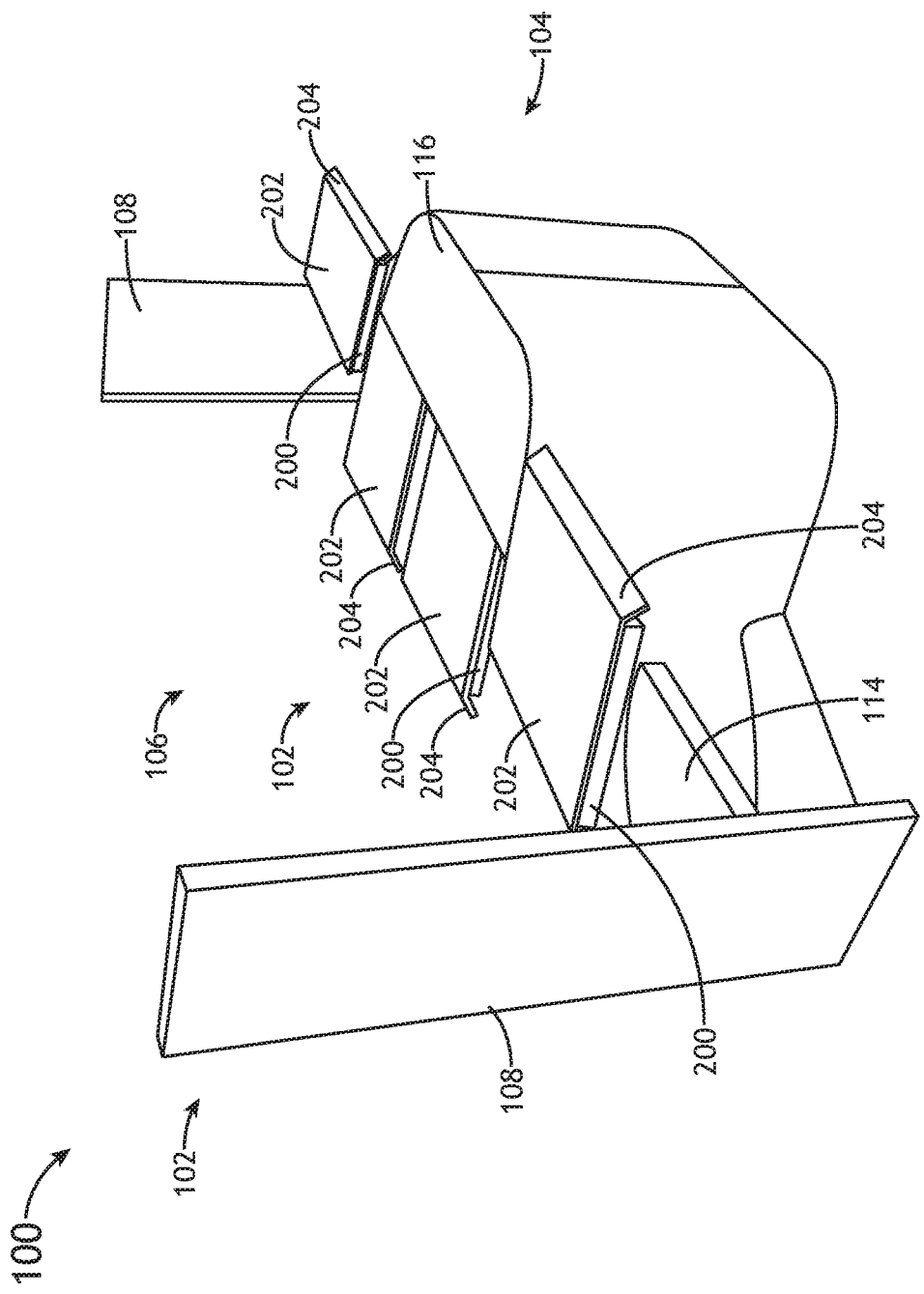
FIG. 2B illustrates actuatable display devices in an aircraft passenger compartment suite, in accordance with one or more embodiments of the disclosure.
Figure 3A:
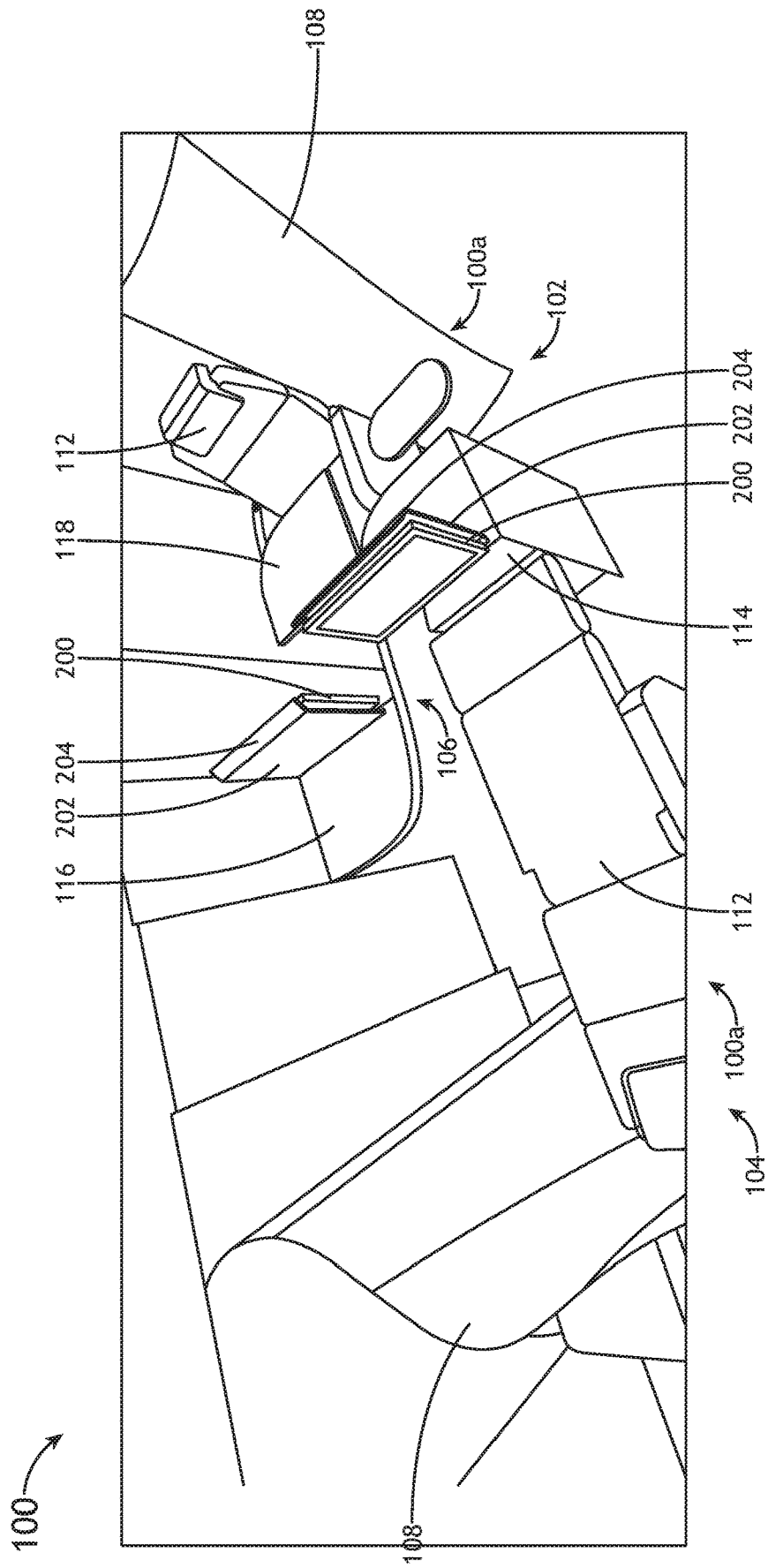
FIG. 3A illustrates actuatable display devices in an aircraft passenger compartment suite, in accordance with one or more embodiments of the disclosure.
Figure 3B:
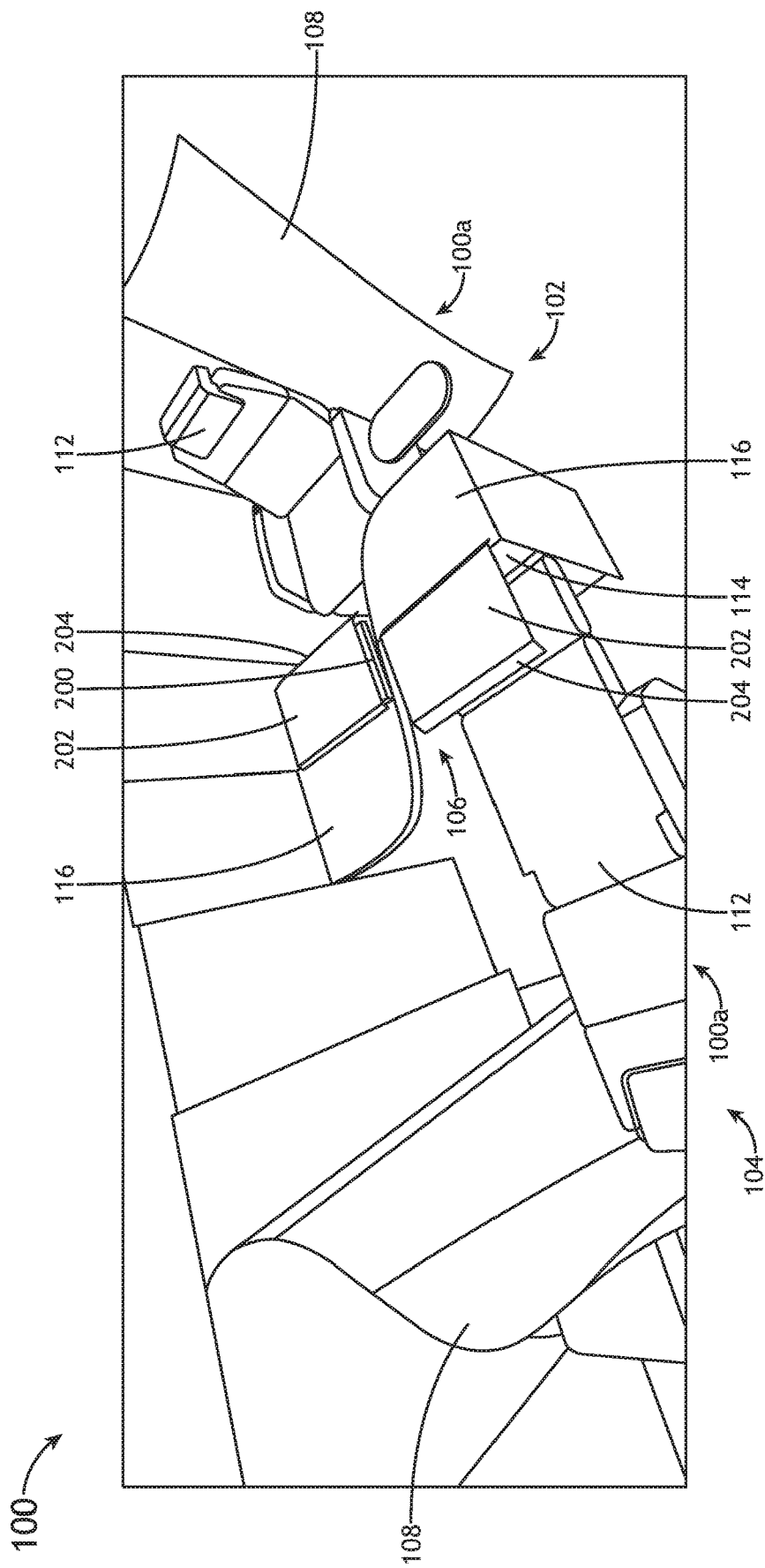
FIG. 3B illustrates actuatable display devices in an aircraft passenger compartment suite, in accordance with one or more embodiments of the disclosure.
Figure 3C:
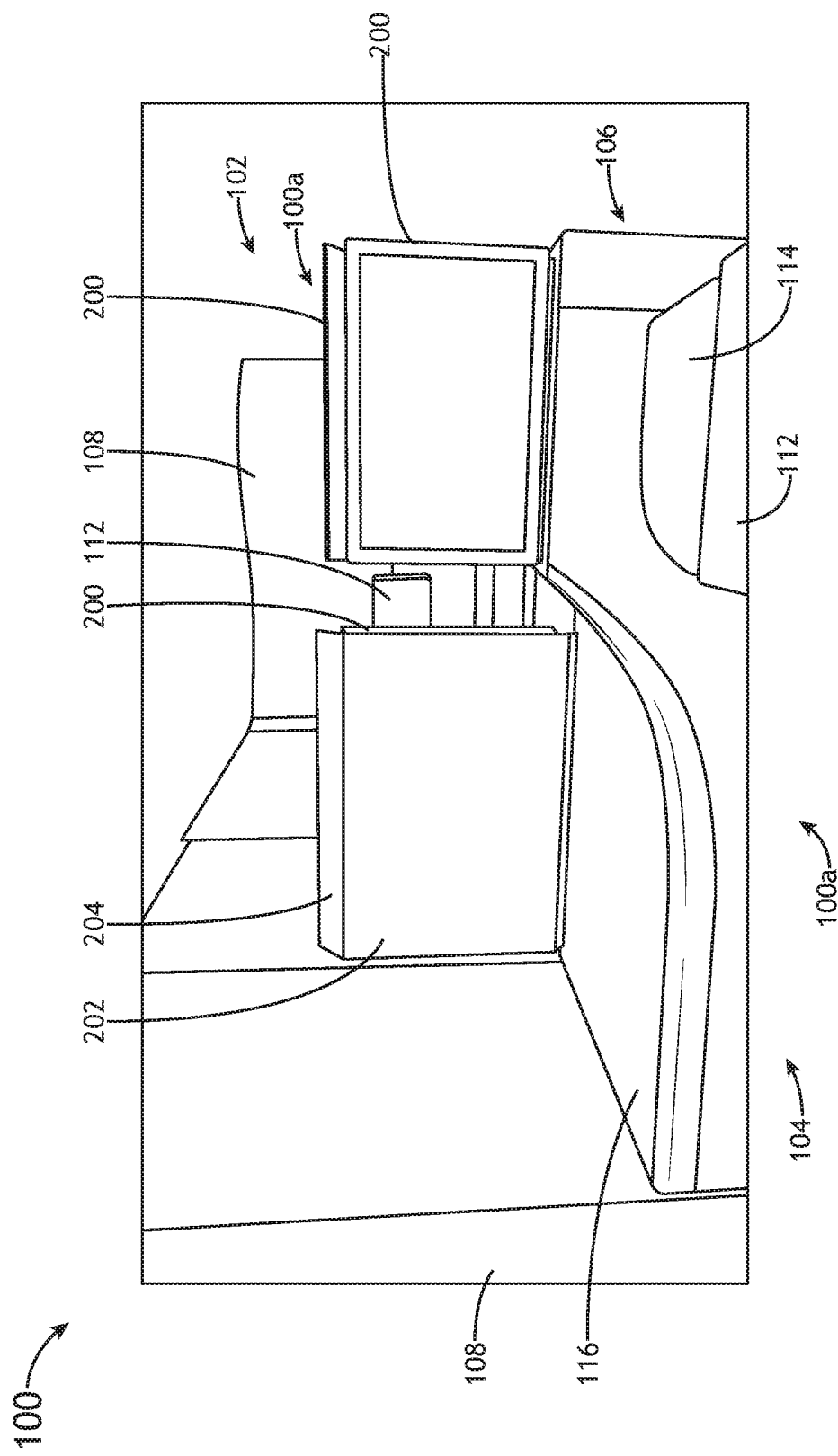
FIG. 3C illustrates actuatable display devices in an aircraft passenger compartment suite, in accordance with one or more embodiments of the disclosure.
Figure 3D:
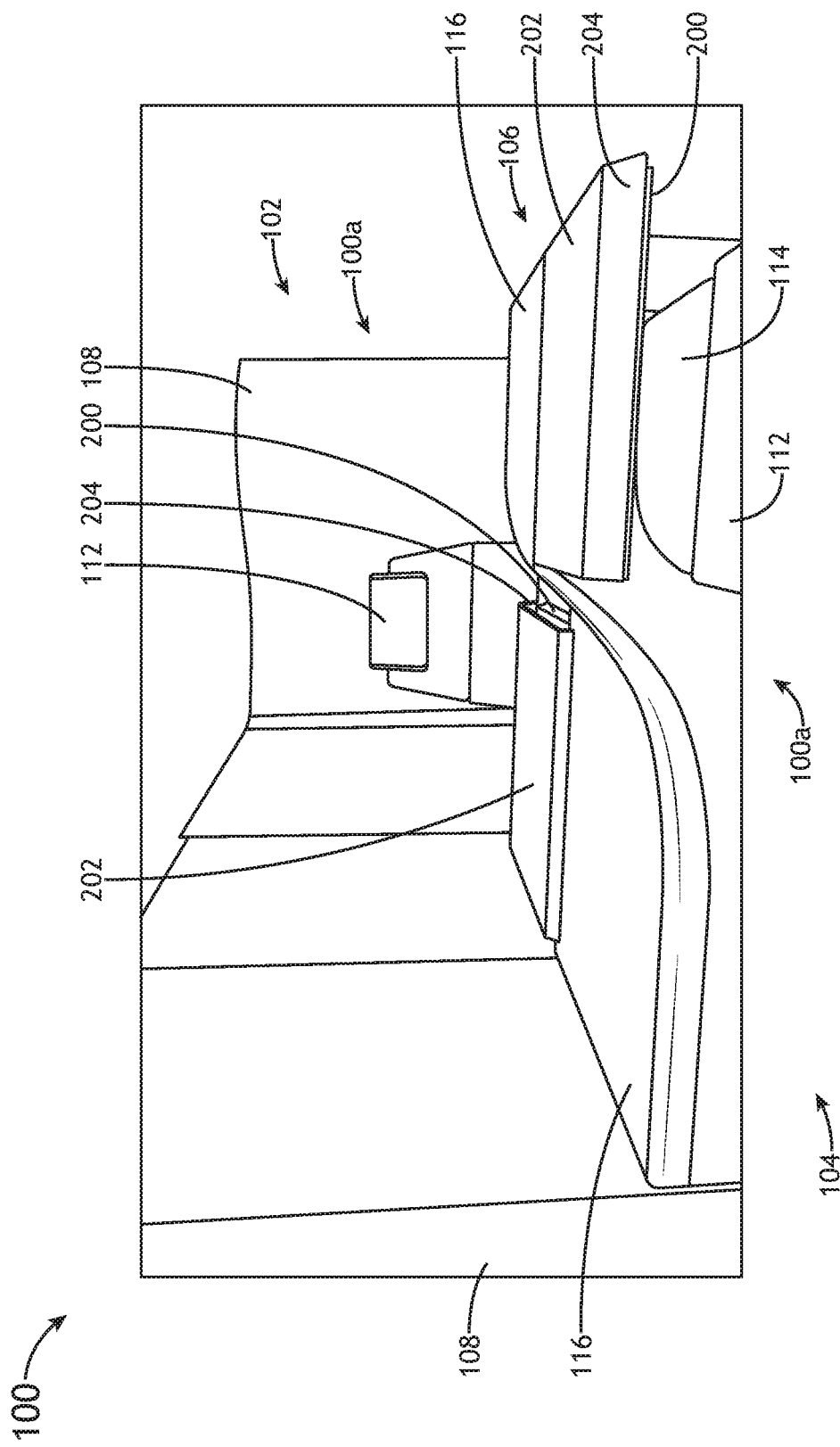
FIG. 3D illustrates actuatable display devices in an aircraft passenger compartment suite, in accordance with one or more embodiments of the disclosure.
Figure 4A:
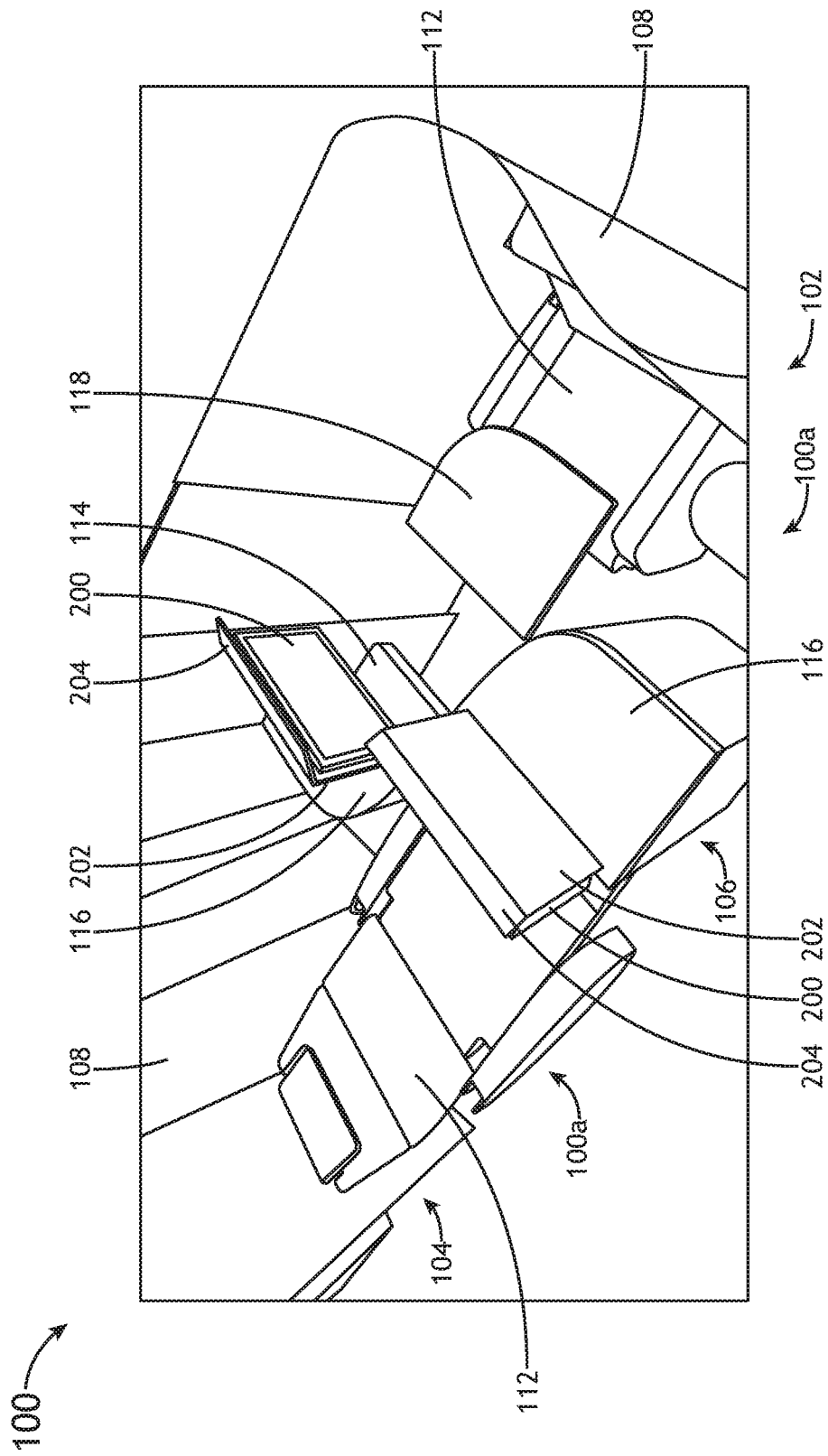
FIG. 4A illustrates actuatable display devices in an aircraft passenger compartment suite, in accordance with one or more embodiments of the disclosure.
Figure 4B:
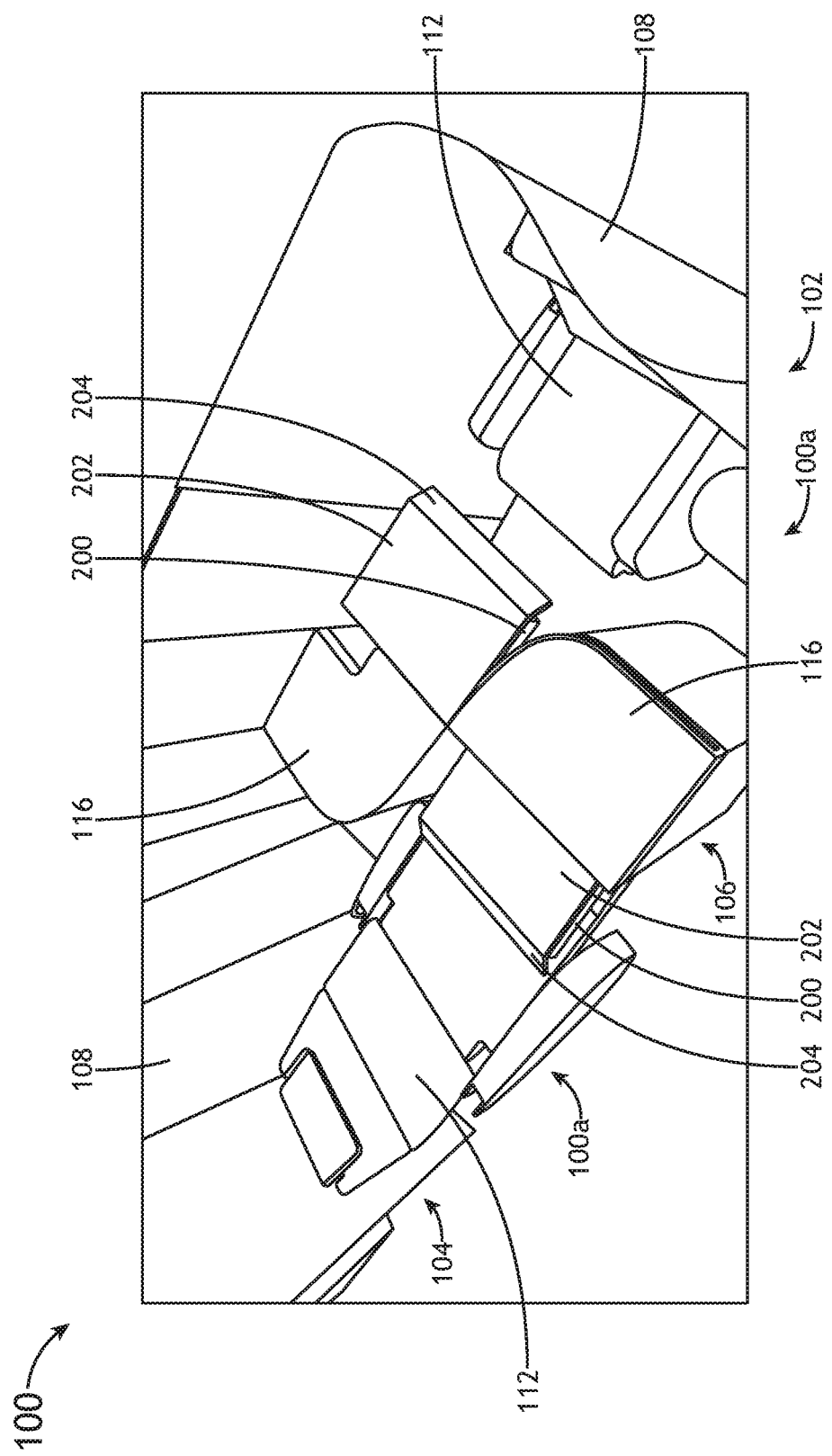
FIG. 4B illustrates actuatable display devices in an aircraft passenger compartment suite, in accordance with one or more embodiments of the disclosure.
Figure 4C:
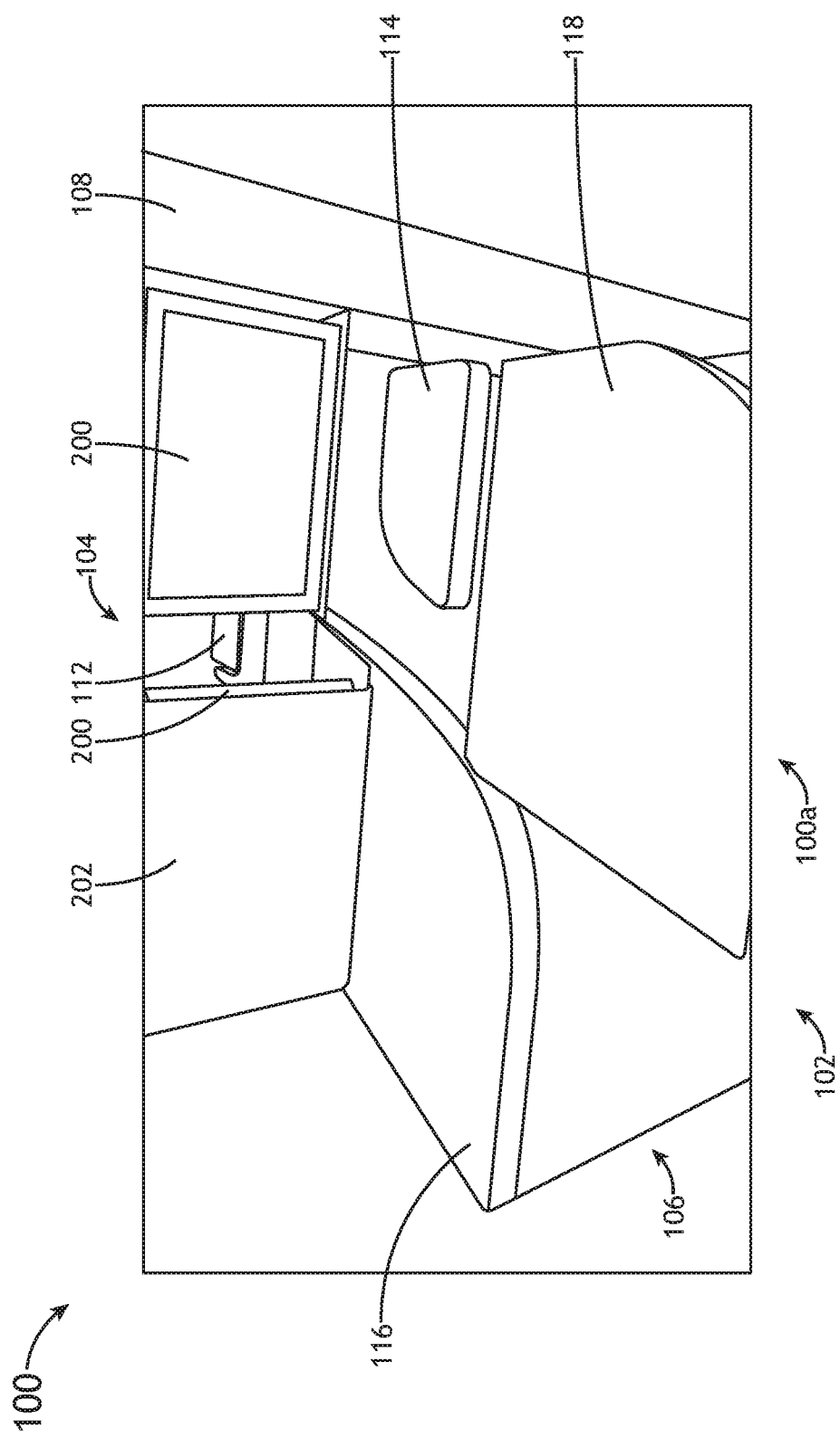
FIG. 4C illustrates actuatable display devices in an aircraft passenger compartment suite, in accordance with one or more embodiments of the disclosure.
Figure 4D:
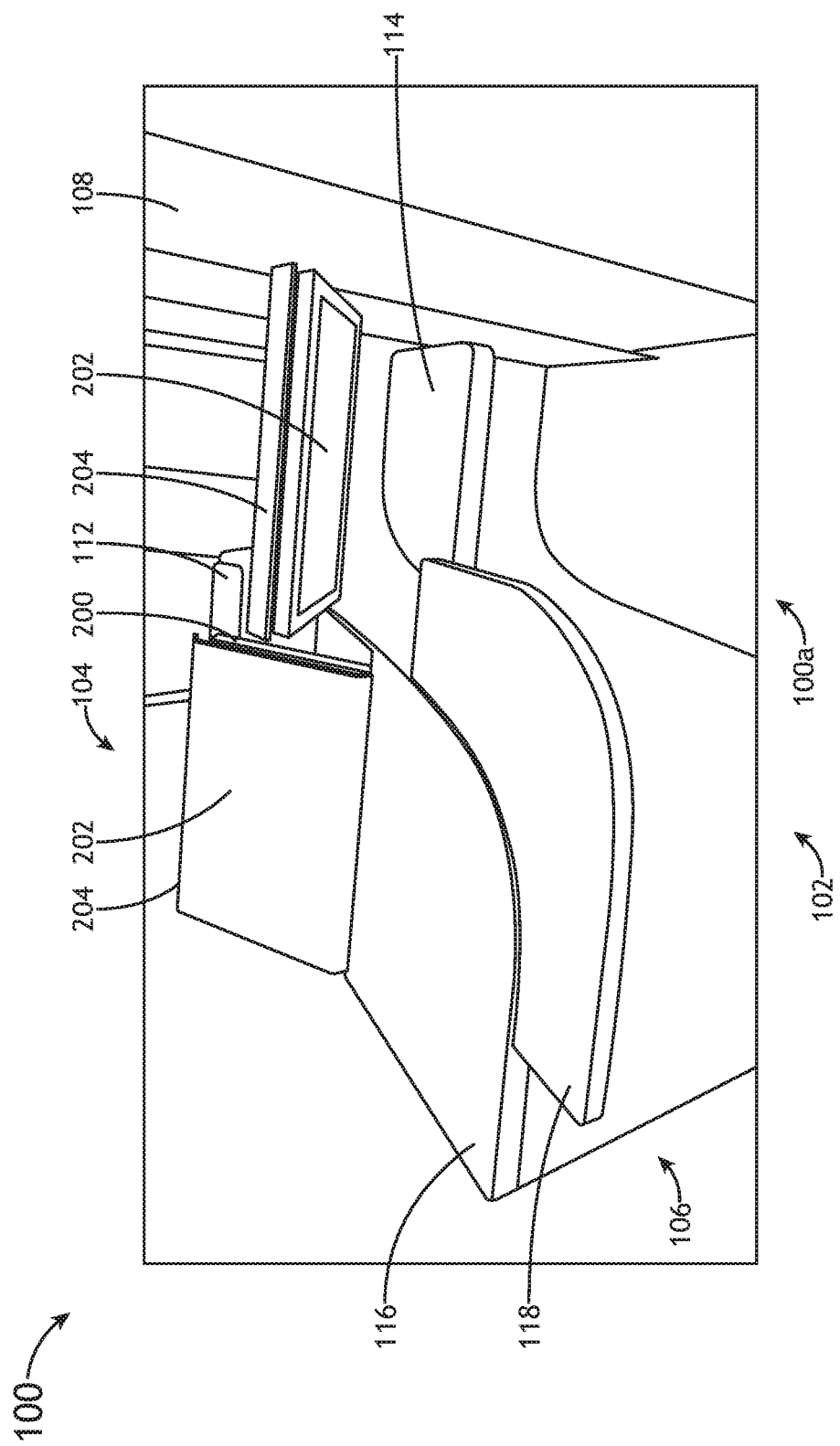
FIG. 4D illustrates actuatable display devices in an aircraft passenger compartment suite, in accordance with one or more embodiments of the disclosure.
Figure 4E:
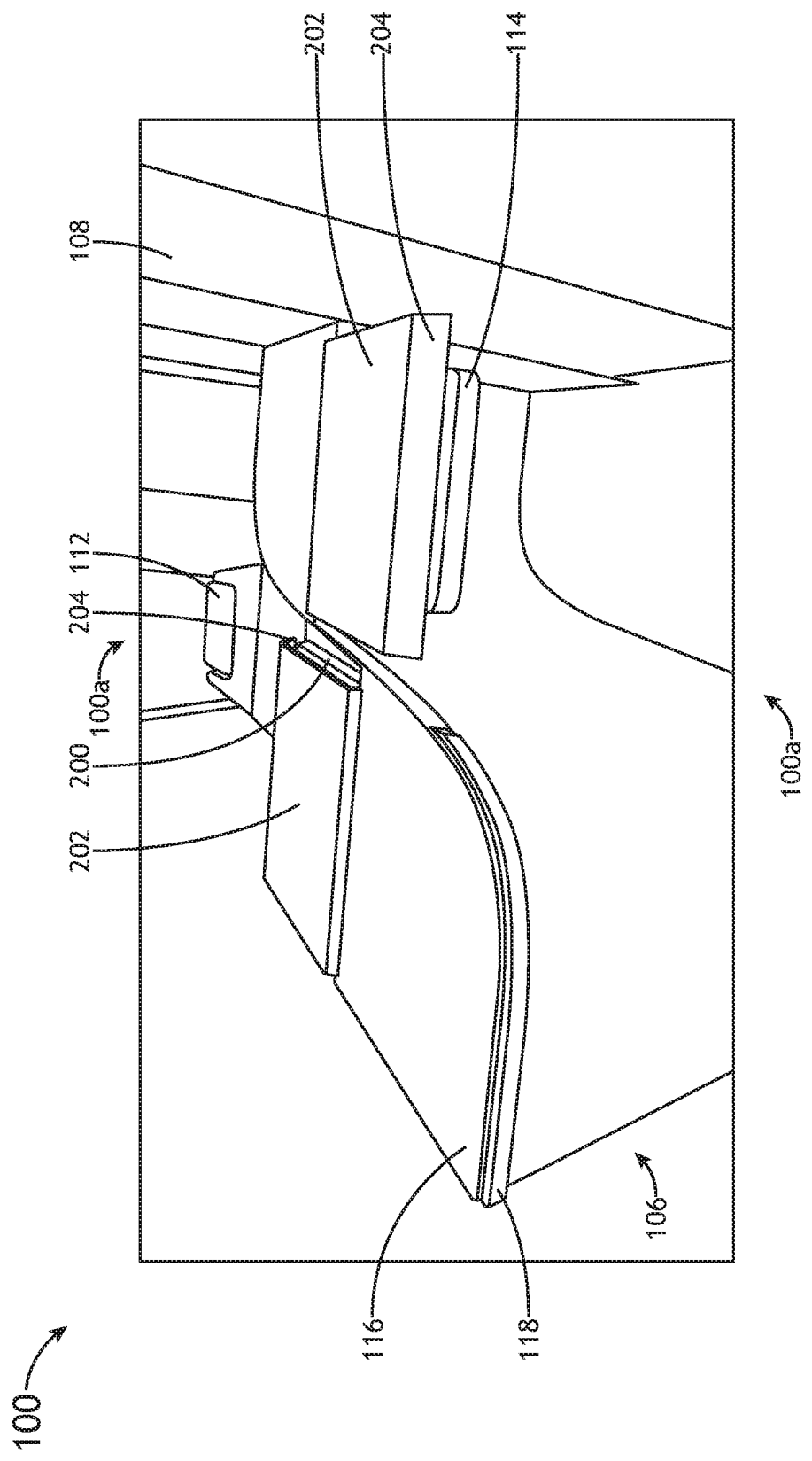
FIG. 4E illustrates actuatable display devices in an aircraft passenger compartment suite, in accordance with one or more embodiments of the disclosure.

The one or more display devices 200 may be configured to actuate between a deployed position and a stowed position, as illustrated in the transition between FIGS. 2A and 2B, in the transition between FIGS. 3A and 3B, in the transition between FIGS. 3C and 3D, in the transition between FIGS. 4A and 4B, and in the transition between FIGS. 4C-4E.

The one or more display devices 200 may face outward when upright in the deployed position and may be in either a landscape orientation or a portrait orientation toward an aircraft seat 112, such that content on the one or more display devices 200 may be viewable. The one or more display devices 200 may be rotated about an axis to face downward (e.g., to a floor surface, a footwell, a surface of a monument 116, or the like in the aircraft passenger compartment suite 100) in the stowed position.

It is noted herein that, depending on the position with a particular side 102, 104 of the aircraft passenger compartment suite 100, that the one or more display devices 200 may actuate in the same direction (e.g., toward aircraft seats 112 within the same side 102 or 104 of the aircraft passenger compartment suite 100 when transitioning from outward-facing to downward-facing) or may actuate in different directions (e.g., toward aircraft seats 112 within a different side 102 or 104 of the aircraft passenger compartment suite 100 when transitioning from outward-facing to downward-facing).

A plate 202 may be coupled to a rear surface of the one or more display devices 200. When in the stowed position, the plate 202 may act as a horizontal surface when facing upward following a rotation about the axis of the one or more display devices 200. For example, the plate 202 may act as an extension of a monument 116. By way of another example, the plate 202 may act as a standalone table. The plate 202 may include a pattern or other decorative surface.

The plate 202 may include a lip or guard 204. For example, the guard 204 may be configured to protect at least a portion (e.g., a side or edge) of the one or more display devices 200 when the one or more display devices 200 are in the stowed position. For instance, the guard 204 may prevent interaction with the one or more display devices 200 by a passenger in the aircraft passenger compartment suite 100 (e.g., when moving, in the case of an emergency, or the like) when the one or more display devices 200 are in the stowed position. It is noted herein that a screen portion of the one or more display devices 200 may be protected with a shield or cover when in the stowed position (e.g., between the one or more display devices 200 and the floor surface, the footwell, the surface of a monument 116, or the like in the aircraft passenger compartment suite 100), in addition to or in the alternative to the guard 204.

Although embodiments of the disclosure illustrate the plate 202 as being a component coupled to the rear surface of the one or more display devices 200, it is noted herein the rear surface of the one or more display devices 200 may be configured to act as a horizontal surface when facing upward following a rotation about the axis of the one or more display devices 200. In this regard, the plate 202 may not be required in the aircraft passenger compartment suite 100. In addition, the guard 204 may be coupled directly to the one or more display devices 200 or may not be required in the aircraft passenger compartment suite 100. Therefore, the above description should not be interpreted as a limitation on the scope of the disclosure but merely an illustration.

The one or more display devices 200 may be driven by an actuator (e.g., a motor, or the like) coupled to a controller of the aircraft passenger compartment suite 100) between the deployed position and the stowed position. It is noted herein, however, the one or more display devices 200, may be manually deployed and/or stowed.

The one or more display devices 200 may be docked when in the deployed position and/or the stowed position to prevent unintended actuation of the one or more display devices 200. For example, where the one or more display devices 200 are installed proximate to a privacy divider 106, the privacy divider 106 may include one or more anchor points configured to secure to the one or more display devices 200. By way of another example, where the one or more display devices 200 are installed proximate to a privacy divider 106, the one or more display devices 200 may include one or more anchor points configured to secure to the privacy divider 106.

Docking the one or more display devices 200 with the one or more anchor points when in the deployed position and/or the stowed position may reduce or eliminate the need for actuating harnesses and/or actuating mechanisms. For example, the one or more display devices 200 may be allowed to freely actuate between the deployed position and the stowed position without the assistance of actuating harnesses and/or actuating mechanisms, as the one or more anchor points may reduce or eliminate the need for the actuating harnesses and/or actuating mechanisms to lock the one or more display devices 200 in the deployed position and/or the stowed position.

It is noted herein that actuating the one or more display devices 200 from the deployed position to the stowed position may have a few benefits. For example, doing so may increase open area in a privacy divider 106 between the side 102 and the side 104. For instance, the combined width of the one or more display devices 200 in aircraft passenger compartment 100a may be substantially similar to the width of the privacy divider 106 when the one or more display devices 200 in the aircraft passenger compartment 100a are in the deployed position.

It is noted herein that the one or more display devices 130 (e.g., as illustrated in FIGS. 1A and 1B) and the one or more display devices 200 (e.g., as illustrated in FIGS. 2A-4E) may be installed separately or simultaneously within the aircraft passenger compartment suite 100 (e.g., within the side 102 or the side 104 of the aircraft passenger compartment suite 100). In this regard, the present disclosure is not limited to the use of the one or more display devices 130 or the use of the one or more display devices 200 in the aircraft passenger compartment suite 100, but rather that the one or more display devices 130, 200 may both be installed within the aircraft passenger compartment suite 100.

In addition, it is noted herein that any embodiments directed to the one or more display devices 130 may be directed to the one or more display devices 200. Further, it is noted herein that any embodiments directed to the one or more display devices 200 may be directed to the one or more display devices 130. Therefore, the above description should not be interpreted as a limitation on the scope of the disclosure but merely an illustration.

In some embodiments, as illustrated in FIGS. 4A-4E, the tray 118 may actuate into and out of a cavity defined within the monument 116 of the privacy divider 106.

Referring again generally to FIGS. 1A-4E, the aircraft passenger compartment suite 100 may include one or more speakers configured to provide accompanying sound to media content being displayed on the one or more display devices 130 and/or the one or more display devices 200 (e.g., a display device 130 and/or a display device 200 in the side 102, a display device 130 and/or a display device 200 in the side 104, and/or a display device 130 and/or a display device 200 shared between the side 102 and the side 104).

It is noted herein a passenger compartment 100a may include, but is not limited to an aircraft seat 112, an ottoman 114, a tray 118, a display device 130 with projection device 132 and/or a display device 200, or other components as described for the aircraft passenger compartment suite 100. Although embodiments of the disclosure present the aircraft passenger compartment suite 100 as including sides 102, 104, with each side including one or more aircraft seats 112, the aircraft passenger compartment suite 100 may include a single side with one or more aircraft seats 112. For example, the aircraft passenger compartment suite 100 may be bounded by one or more privacy shell elements 108 instead of having the privacy divider 106, such that there is only one side with one or more aircraft seats 112. It is noted herein that any embodiments related to the aircraft passenger compartment suite 100 including sides 102, 104 may be extended to apply to an aircraft passenger compartment suite 100 with a single side. Therefore, the above description should not be interpreted as a limitation on the scope of the disclosure but merely an illustration.

Figure 5:
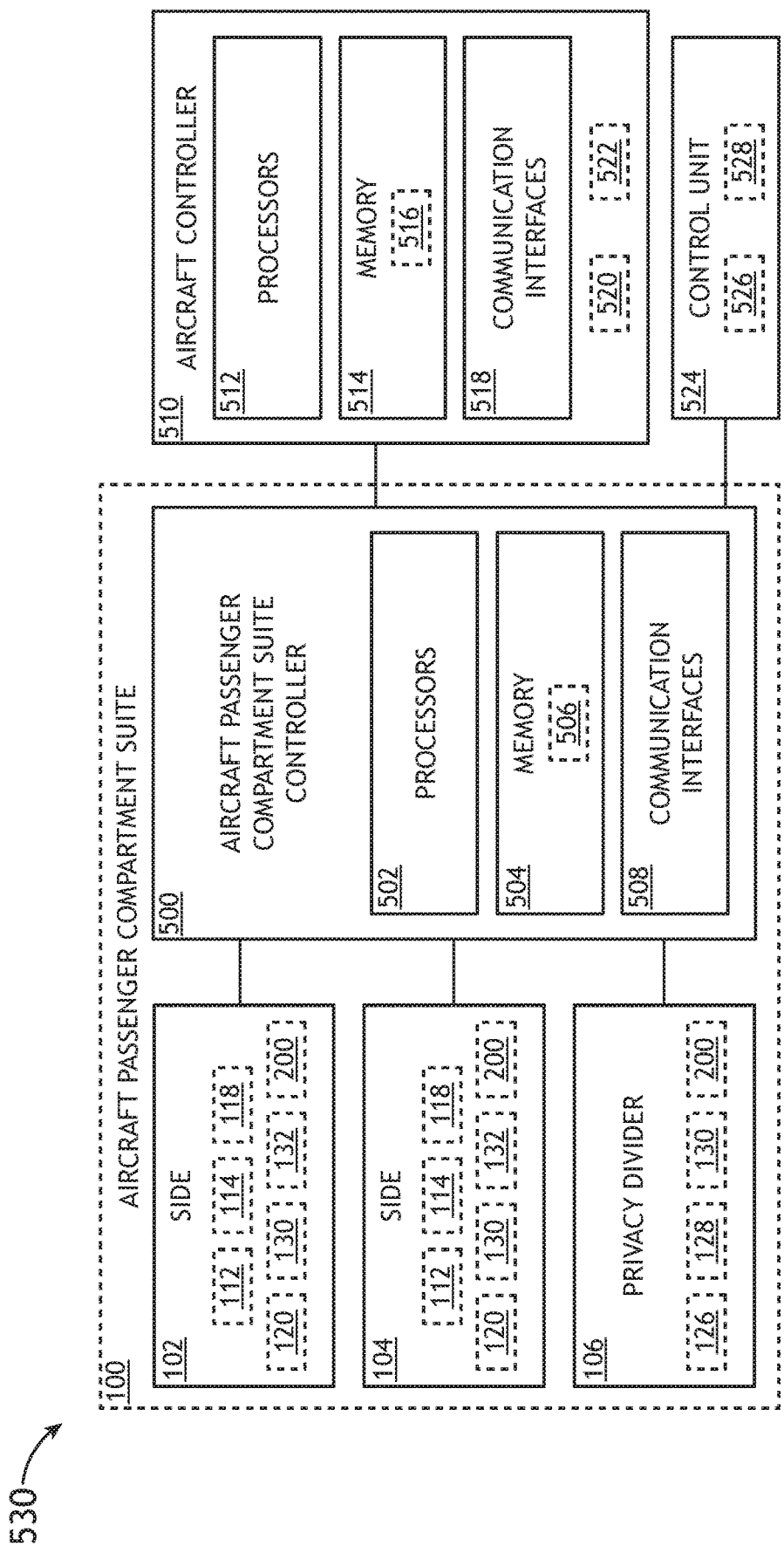
FIG. 5 illustrates a block diagram of an aircraft including an aircraft passenger compartment suite, in accordance with one or more embodiments of the disclosure.

FIG. 5 illustrates a block diagram of a passenger aircraft 530 including the aircraft passenger compartment suite 100, in accordance with one or more embodiments of the disclosure.

The passenger aircraft 530 may include one or more aircraft passenger compartment suite controllers 500 (e.g., within the aircraft passenger compartment suite 100). The one or more aircraft passenger compartment suite controllers 500 may include one or more processors 502 and memory 504. The memory 504 may store one or more sets of program instructions 506. The one or more processors 502 may be configured to execute the one or more sets of program instructions 506 to carry out one or more of the various steps described throughout the present disclosure. The one or more aircraft passenger compartment suite controllers 500 may include one or more communication interfaces 508.

The one or more aircraft passenger compartment suite controllers 500 may be coupled (e.g., physically and/or communicatively coupled) to one or more components within the side 102 (e.g., the aircraft seat 112, the ottoman 114, the tray 118, the one or more lights 120, the one or more display devices 130, the projection device 132, and/or the one or more display devices 200).

The one or more aircraft passenger compartment suite controllers 500 may be coupled (e.g., physically and/or communicatively coupled) to one or more components within the side 104 (e.g., the aircraft seat 112, the ottoman 114, the tray 118, the one or more lights 120, the one or more display devices 130, the projection device 132, and/or the one or more display devices 200).

The one or more aircraft passenger compartment suite controllers 500 may be coupled (e.g., physically and/or communicatively coupled) to one or more components within the privacy divider 106 (e.g., the one or more actuatable panels 126, 128, the one or more display devices 130, and/or the one or more display devices 200).

The one or more aircraft passenger compartment suite controllers 500 may transmit instructions, power, control signals, data, or the like to the one or more components within the side 102, the side 104, and/or the privacy divider 106. The one or more aircraft passenger compartment suite controllers 500 may receive instructions, power, control signals, data, or the like from the one or more components within the side 102, the side 104, and/or the privacy divider 106.

The one or more aircraft passenger compartment suite controllers 500 may be coupled (e.g., physically and/or communicatively coupled) to one or more external aircraft controllers 510. The one or more aircraft controllers 510 may include one or more processors 512 and memory 514. The memory 514 may store one or more sets of program instructions 516. The one or more processors 512 may be configured to execute the one or more sets of program instructions 516 to carry out one or more of the various steps described throughout the present disclosure. The one or more aircraft controllers 510 may include one or more communication interfaces 518.

The one or more aircraft controllers 510 may be coupled to one or more display devices 520. The one or more aircraft controllers 510 may be coupled to one or more user input devices 522.

The one or more aircraft passenger compartment suite controllers 500 may be coupled to a control unit 524. The control unit 524 may be coupled to one or more display devices 526. The control unit 524 may be coupled to one or more user input devices 528. The passenger control unit 524 may be positioned within the aircraft passenger compartment suite 100 for use by a passenger. The passenger control unit 524 may be positioned on an external surface of the aircraft passenger compartment suite 100 for use by a crew member.

It is noted herein the control unit 524 may be considered to be at least a portion of the one or more aircraft passenger compartment suite controllers 500. For example, the control unit 524 may be a component of the one or more aircraft passenger compartment suite controllers 500. By way of another example, the control unit 524 may be integrated within the one or more aircraft passenger compartment suite controllers 500. In addition, it is noted herein the control unit 524 may be considered to include and/or be a passenger seat control unit, for purposes of the present disclosure.

The one or more processors 502, 512 may include any one or more processing elements known in the art. In this sense, the one or more processors 502, 512 may include any microprocessor device configured to execute algorithms and/or program instructions. In general, the term "processor" may be broadly defined to encompass any device having one or more processing elements, which execute a set of program instructions from a non-transitory memory medium (e.g., the memory 504, 514), where the one or more sets of program instructions 506, 516 are configured to cause the one or more processors 502, 512 to carry out any of one or more process steps.

The memory 504, 514 may include any storage medium known in the art suitable for storing the one or more sets of program instructions 506, 516 executable by the associated one or more processors 502, 512. For example, the memory 504, 514 may include a non-transitory memory medium. For instance, the memory 504, 514 may include, but is not limited to, a read-only memory (ROM), a random access memory (RAM), a magnetic or optical memory device (e.g., disk), a magnetic tape, a solid state drive, and the like. The memory 504, 514 may be configured to provide display information to the one or more display devices 130, 200, 520, 526. In addition, the memory 504, 514 may be configured to store user input information from the one or more user input devices 522, 528. The memory 504, 514 may be housed in a common controller housing with the one or more processors 502, 512. The memory 504, 514 may, alternatively or in addition, be located remotely with respect to the spatial location of the processors 502, 512, the one or more aircraft passenger compartment suite controllers 500 and/or the one or more aircraft controllers 510. For instance, the one or more processors 502, 512, the one or more aircraft passenger compartment suite controllers 500, and/or the one or more aircraft controllers 510 may access a remote memory 504, 514 (e.g., server), accessible through a network (e.g., internet, intranet, and the like) via one or more communication interfaces.

The one or more communication interfaces 508, 518 may be operatively configured to communicate with one or more components of the one or more aircraft passenger compartment suite controllers 500 0 and/or the one or more aircraft controllers 510. For example, the one or more communication interfaces 508, 518 may also be coupled (e.g., physically, electrically, and/or communicatively) with the one or more processors 502, 512 to facilitate data transfer between components of the one or more components of the aircraft passenger compartment suite controller 500 and/or the one or more components of the aircraft controller 510 and the one or more processors 502, 512. For instance, the one or more communication interfaces 508, 518 may be configured to retrieve data from the one or more processors 502, 512, or other devices, transmit data for storage in the memory 504, 514, retrieve data from storage in the memory 504, 514, or the like. By way of another example, the one or more aircraft passenger compartment suite controllers 500 and/or the one or more aircraft controllers 510 may be configured to receive and/or acquire data or information from other systems or tools by a transmission medium that may include wireline and/or wireless portions. By way of another example, the one or more aircraft passenger compartment suite controllers 500 and/or the one or more aircraft controllers 510 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the one or more aircraft passenger compartment suite controllers 500 and/or the one or more aircraft controllers 510 and the other subsystems (e.g., of the passenger aircraft 530 and/or the aircraft passenger compartment suite 100). In addition, the one or more aircraft passenger compartment suite controllers 500 and/or the one or more aircraft controllers 510 may be configured to send data to external systems via a transmission medium (e.g., network connection).

Although the present disclosure is directed to the one or more aircraft passenger compartment suite controllers 500 and the one or more aircraft controllers 510 being separate, it is noted herein the one or more aircraft passenger compartment suite controllers 500 and the one or more aircraft controllers 510 may be the same and/or share select components. Therefore, the above description should not be interpreted as a limitation on the present disclosure but merely an illustration.

The one or more display devices 130, 200, 520, 526 may include any display device known in the art. For example, the one or more display devices 130, 200, 520, 526 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices 130, 200, 520, 526 may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 522, 528 may include any user input device known in the art. For example, the one or more user input devices 522, 528 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 130, 200, 520, 526 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices 130, 200, 520, 526 being indirectly coupled to the corresponding one or more user input devices 522, 528 indirectly (e.g., via the one or more aircraft passenger compartment suite controllers 500 and/or the one or more aircraft controllers 510), it is noted herein the one or more display devices 130, 200, 520, 526 may be directly coupled to the corresponding one or more user input devices 522, 528. For example, the one or more display devices 130, 200, 520, 526 may be housed with the one or more user input devices 522, 528 in a common user interface housing. Therefore, the above description should not be interpreted as a limitation on the present disclosure but merely an illustration.

Although embodiments of the present disclosure illustrate the actuation of components of the aircraft passenger compartment suite 100 via the control unit 524 (e.g., where the components are driven via a motor), it is noted herein that one or more components of the aircraft seat 112 may be actuated by engaging a handle that activates one or more analog mechanical assemblies. Therefore, the above description should not be interpreted as a limitation on the scope of the disclosure but merely an illustration.

Although the present disclosure is directed to the aircraft passenger compartment suite 100 being installed within the passenger aircraft 530, it is noted herein that suites similar to the aircraft passenger compartment suite 100 or components of the aircraft passenger compartment suite 100 may be installed within any number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

It is noted herein that one or more components of the aircraft passenger compartment suite 100 may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger compartment suite, comprising:
   a first side comprising:
      a first display device positioned adjacent to a first aircraft seat, the first display device being configured to actuate between a first display device deployed position and a first display device stowed position, the first display device configured to display an image output when in the first display device deployed position, the first display device configured to rotate about an axis to face downward towards a floor surface in the first display device stowed position; and
      a first plate positioned adjacent to a rear surface of the first display device, the first plate configured to be an extension of a first horizontal surface in the first side of the aircraft passenger compartment suite when the first display device is in the first display device stowed position; and
   a second side comprising:
      a second display device adjacent to a second aircraft seat, the second display device being configured to actuate between a second display device deployed position and a second display device stowed position, the second display device configured to display an image output when in the second display device deployed position, the second display device configured to rotate about an axis to face downward towards a floor surface in the second display device stowed position; and
      a second plate positioned adjacent to a rear surface of the second display device, the second plate configured to be an extension of a second horizontal surface in the second side of the aircraft passenger compartment suite when the second display device is in the second display device stowed position.

2. The aircraft passenger compartment suite of claim 1, the first plate including a guard configured to protect at least a portion of the first display device when the first display device is in the first display device stowed position.

3. The aircraft passenger compartment suite of claim 1, the first horizontal surface being a surface of a monument in the first side of the aircraft passenger compartment suite.

4. The aircraft passenger compartment suite of claim 1, the second plate including a guard configured to protect at least a portion of the second display device when the second display device is in the second display device stowed position.

5. The aircraft passenger compartment suite of claim 1, the second horizontal surface being a surface of a monument in the second side of the aircraft passenger compartment suite.

6. The aircraft passenger compartment suite of claim 1, the deployed position for the first display device being an outward-facing position toward the first aircraft seat.

7. The aircraft passenger compartment suite of claim 1, the deployed position for the second display device being an outward-facing position toward the second aircraft seat.

8. The aircraft passenger compartment suite of claim 1, further comprising:
- a privacy divider configured to separate the first side of the aircraft passenger compartment suite including the first aircraft seat and the second side of the aircraft passenger compartment suite including the second aircraft seat; and
- a collapsible display device positioned adjacent to the privacy divider of the aircraft passenger compartment suite, the collapsible display device positioned adjacent to at least one of the first aircraft seat or the second aircraft seat, the collapsible display device configured to actuate between a deployed position and a stowed position, the collapsible display device configured to display an image output when in the deployed position.

* * * * *